United States Patent [19]
Sorin et al.

[11] Patent Number: 5,557,400
[45] Date of Patent: Sep. 17, 1996

[54] MULTIPLEXED SENSING USING OPTICAL COHERENCE REFLECTOMETRY

[75] Inventors: Wayne V. Sorin, Mountain View; Douglas M. Baney, Los Altos, both of Calif.

[73] Assignee: Hewlett-Packard Company, Palo Alto, Calif.

[21] Appl. No.: 389,222

[22] Filed: Feb. 15, 1995

[51] Int. Cl.$^6$ .............................. G01B 9/02; G01B 11/16
[52] U.S. Cl. ........................................ 356/73.1; 250/227.19
[58] Field of Search ...................... 356/73.1; 250/227.19, 250/227.27

[56] References Cited

U.S. PATENT DOCUMENTS

| | | | |
|---|---|---|---|
| 5,187,362 | 2/1993 | Keeble | 356/73.1 X |
| 5,268,738 | 12/1993 | Baney et al. | 250/227.19 X |
| 5,341,205 | 8/1994 | McLandrich et al. | 356/73.1 |
| 5,383,015 | 1/1995 | Grimes | 356/73.1 |

FOREIGN PATENT DOCUMENTS

| | | | |
|---|---|---|---|
| 2165118 | 4/1986 | United Kingdom | 356/73.1 |
| WO89/02067 | 3/1989 | WIPO | 356/73.1 |

OTHER PUBLICATIONS

Danielson et al "Guided-wave reflectometry with micrometer resolution" Applied Optics, vol. 26 No. 14/15 Jul. 1987 pp. 2836–42.

Primary Examiner—Vincent P. McGraw

[57] ABSTRACT

An apparatus and method for measuring the change in a dimension that characterizes a structure. The apparatus operates by measuring the distance between a plurality of reflective markers located along an optical fiber. The optical fiber is attached to the structure in such a manner that a change in the dimension in question results in a change in the optical delay of the fiber between at least two of the markers. The fiber is illuminated with low coherence light. Each marker reflects a portion of a light signal traversing the fiber from a first end thereof. The markers are located at predetermined distances from the first end. Light reflected from the markers is collected and introduced into an autocorrelator that measures the coherent sum of a first signal comprising the collected light and a second signal comprising the collected light delayed by a variable time delay. The coherent sum is measured as a function of said variable time delay. Various embodiments of the present invention utilize different methods for identifying the specific markers. For example, the markers may be constructed such that each pair of markers reflects light of a characteristic wavelength. In a second embodiment, the distance between each pair of markers is used to identify the pair of markers. In a third embodiment, the reflectivity of each marker is used to identify the marker.

11 Claims, 3 Drawing Sheets

MULTIPLEXED SENSING USING OPTICAL COHERENCE REFLECTROMETRY

FIELD OF THE INVENTION

The present invention relates to the measurement of distance, and more particularly, to an improved method for measuring the distance between optically reflecting markers within an optical fiber or the like.

BACKGROUND OF THE INVENTION

There are numerous situations in which it would be advantageous to measure the distance between markers on an optical fiber. For example, in remote temperature sensing, the distance between the markers varies with average temperature of the section of fiber between the markers. Hence, a measurement of the distance between the markers allows one to infer the average temperature of the environment in the vicinity of the fiber connecting the markers.

Similarly, the distance between the markers will change if the fiber is placed under a strain. This provides a means for measuring the deformation of a structure to which the optical fiber is attached. By incorporating fiber-optic sensor arrays into structures such as bridges, building frames, dams and tunnels, material strains can be monitored throughout the lifetime of the structure.

Low coherence interferometry is an attractive technique for this type of distance measurement. While low coherence interferometry maintains the accuracy of conventional single-frequency (i.e. long coherence length) interferometry, it avoids many of the limitations and problems associated with long coherence length signals. In particular, absolute length or time delay can be measured. This is in contrast to fixed-frequency coherent interferometry where only changes in delay can be measured. Also, due to the short coherence length of the sensing signal, undesirable time-varying interference from stray system reflections is eliminated. Another advantage of low coherence interferometry is the ability to coherence multiplex many sensors onto a single optical signal without requiring the use of relatively complex time or frequency multiplexing techniques.

Low coherence interferometry operates by detecting interference of a reference light signal with a light signal generated when light from the same source is reflected backwards down the fiber in which markers are placed. The two signals will coherently interfere when the optical path length of the reference path is the same as that of the reflected light signal. This interference is normally detected by varying the reference path length and observing the path length at which the interference at the output of a photodiode illuminated with light from both paths is maximized. The reference path length is often varied by moving a mirror that is part of the optical path.

While conventional low coherence interferometry can measure distances very accurately, the range of distances that can be measured is limited by the degree to which the mirror described above may be moved. In optical sensor arrays, sensor arrays consisting of a fiber that is many meters long with partially reflecting markers every meter are contemplated. Hence, a conventional low coherence interferometry systems would require a reference path length that must be varied over many meters. Such systems are not practical because a reference path having an optical path length that may be varied over many meters is difficult to construct.

Another problem with conventional low coherence interferometry is determining which marker is being measured. If a set of markers is located at equal spacing along a fiber, the output of a low coherence interferometry is a set of peaks that are separated by the distance between the various markers. Since the peaks are indistinguishable in this arrangement, there is no method for assigning a particular peak to a given marker unless the absolute location of at least one of the markers is known. In situations in which the fiber is built into a structure, the absolute distance to the first marker may not be known since there is often an unknown amount of fiber connecting the sensing array to the detector site. In principle, the location of the first marker may be determined by inserting various delays into a reference arm until a peak is detected; however, this process is time consuming, and hence, expensive.

Broadly, it is the object of the present invention to provide an improved apparatus and method for measuring the distances between markers on an optical fiber or the like.

It is a further object of the present invention to provide an apparatus that does not require a reference path that is equal to the distance to the most distant marker.

It is a still further object of the present invention to provide an apparatus and method that allows the signals generated by the various markers to be distinguished from one another at the detector.

These and other objects of the present invention will become apparent to those skilled in the art from the following detailed description of the invention and the accompanying drawings.

SUMMARY OF THE INVENTION

The present invention is an apparatus and method for measuring the change in a dimension that characterizes a structure. The apparatus operates by measuring the optical path length between a plurality of reflective markers located along an optical fiber. The optical fiber is attached to the structure in such a manner that a change in the dimension in question results in a change in a portion of the optical fiber between at least two of the markers. The fiber is illuminated with low coherence light. Each marker reflects a portion of a light signal traversing the fiber from a first end thereof. The markers are located at predetermined distances from the first end. Light reflected from the markers is collected and introduced into an optical autocorrelator that measures the coherent sum of a first signal comprising the collected light and a second signal comprising the collected light delayed by a variable time delay. The coherent sum is measured as a function of said variable time delay. Various embodiments of the present invention utilize different methods for identifying the specific markers. For example, the markers may constructed such that each pair of markers reflects light of a characteristic wavelength. In a second embodiment, the distance between each pair of markers is used to identify the pair of markers. In a third embodiment, the reflectivity of each marker is used to identify the marker.

DETAILED DESCRIPTION OF THE INVENTION

Figure 1:
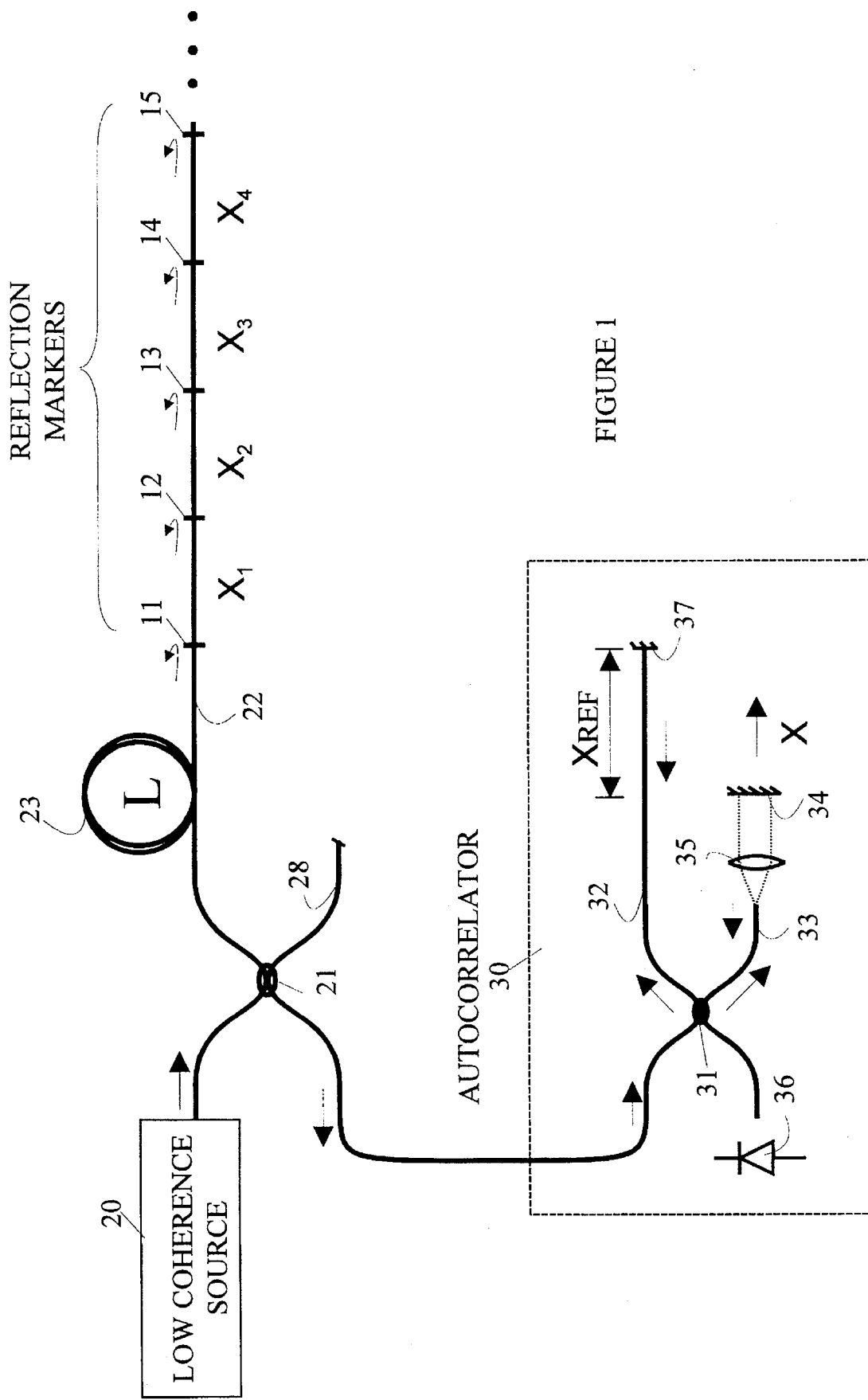
FIG. 1 s a schematic drawing of an experimental arrangement according to the present invention for measuring the distances between a plurality of reflection markers.

The present invention may be more easily understood with reference to FIG. 1 which is a schematic drawing of an experimental arrangement for measuring the distances between a plurality of reflection markers distributed in an optical fiber 22. Exemplary markers are shown at 11–15. The manner in which the markers are created will be discussed in more detail below.

Optical fiber 22 is illuminated with low coherency light from a source 20. The light from source 20 may be considered to be a continuous stream of small coherent light pulses. Each pulse has a coherence distance of a few tens of microns. Each marker reflects a portion of each pulse back down fiber 22, through coupler 21 to an autocorrelation circuit 30. The light signal corresponding to each pulse from source 20 is a train of pulses representing the reflections of the pulse at each marker.

Light entering autocorrelator 30 is split by coupler 31 which generates two signals. The first signal that proceeds down fiber 32 and is reflected back to coupler 31 by mirror 37. The other signal proceeds down fiber 33 and is reflected back to coupler 31 by moving mirror 34. A lens 35 is used to image the light back into optical fiber 33. The light from the two optical paths is recombined in coupler 31 and applied to photodiode 36.

It should be noted that each pulse of a specific pulse train is coherent with each of the other pulses in the train and incoherent with the light from all other trains. Hence, when light from two pulses of the same train is present in coupler 31 the light coherently interferes. However, light signals from the different trains do not coherently interfere.

For the purposes of this discussion denote the distance between markers 11 and 12 by $X_1$, the distance between markers 12 and 13 as $X_2$, and so on. Consider the case in which light from a reflection at marker 11 reenters coupler 31 on fiber 32 at the same time light from the reflection at marker 12 reenters coupler 31 via fiber 33. This will happen when the difference in optical path between arms based on fibers 32 and 33 is equal to $X_1$. Similarly, when the difference in distance is equal to $X_2$ light from a reflection at marker 12 having traveled on fiber 32 will overlap with light from marker 13 on fiber 33 at coupler 31 and another maximum in light interference will be present at photodiode 36.

Figure 2:
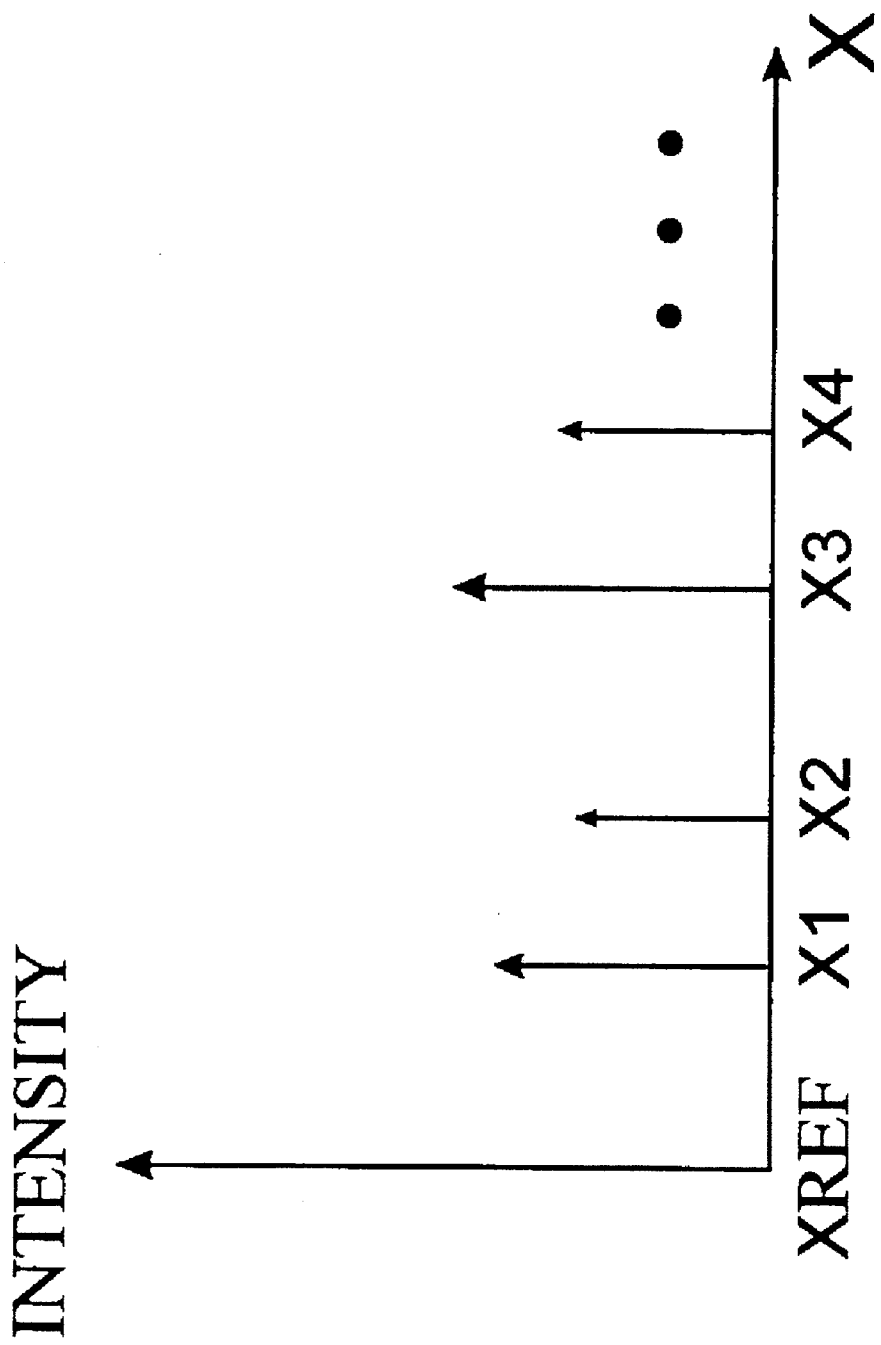
FIG. 2 is a graph of the expected light intensity from the autocorrelator shown in FIG. 1.

To simplify the following discussion, assume that the distances between successive markers on fiber 22 increases, i.e., $X_i < X_{i+1}$. Then if the interference of light at photodiode 36 is plotted against the displacement of mirror 34, a graph similar to that shown in FIG. 2 is obtained. It should be noted that the signals corresponding to the distances between each successive pair of markers will be separated from one another so long as the distances between the successive pairs of markers are distinct. It should also be noted that the amount of reference fiber needed is equal to the minimum inter-marker distance, and the range of travel of the mirror 34 need only be equal to the difference between the minimum and maximum inter-marker distances. It should also be noted that these distances are independent of the distance 23 between the marker array and autocorrelator 30.

The width of each interference signal is approximately equal to the coherence length of the source, which is typically on the order of a few tens of microns. The location of the interference signals is a direct measurement of the absolute optical path length between each pair of markers. The strength of these interference signals depend on the product of the reflectivities from adjacent reflection sites. Because the scan range is much larger than the width of the interference signals, the chance of signal overlap is small. If interference signals do overlap for a short time, they can be identified when they separate by keeping track of their amplitudes which in general are not equal.

Having described the basic operation of apparatus according to the present invention, the manner in which the markers are introduced into fiber 22 to produce the sensing array will now be described in more detail. One method for introducing partially reflecting boundaries into fiber 22 is to cut the fiber and then rejoin the ends using a conventional cable coupling. This can result in markers that reflect $10^{-3}$ of the incident light. While such markers function adequately, the expense of generating the markers is high.

In the preferred embodiment of the present invention, the markers are generated by creating partially reflecting gratings in the fiber core. This may be accomplished by irradiation of the fiber core with two eximer laser beams at sufficient intensity to create damage at regular intervals over a predetermined distance in the core. The periodicity of the damage is determined by the angle of the beams and wavelength of the laser. These markers primarily reflect light whose wavelength is one half the spacing of the ridges of the "grating". Hence, the markers only reflect specific wavelengths.

It will be apparent to those skilled in the art from the preceding discussion that the color sensitivity of the markers may be used to label the various markers provided the spectral width of source 20 is sufficient to cover the reflection wavelengths of all of the marker gratings. In such a system, the markers would be organized as pairs. Each pair of markers would be created so as to reflect the same wavelength. Photodiode 36 would be replaced by a photodetector that includes filters or gratings for selecting the wavelength of the light being measured.

Normally, the light that propagates down fiber 28 is lost. This fiber is included merely to balance coupler 21. However, it will be apparent to those skilled in the art from the foregoing discussion that a second sensor array could be attached to fiber 28 provided the markers on that fiber are distinguishable from those on fiber 22. Such marker differentiation may be accomplished by any of the means discussed above with reference to the markers on fiber 22.

The above described embodiments of the present invention utilize a spacing between the markers that is sufficiently closely matched for each pair of markers to allow a relatively small mirror travel to detect all of the markers. In the above described embodiments of the present invention, the mirror travel had to be equal to the difference between the minimum and maximum marker spacing. An embodiment of the present invention that avoids this limitation is shown in FIG. 3 at 300.

In the arrangement shown at 300, the autocorrelator 310 utilizes a recirculating delay 312 in place of the fixed reference arm shown in FIG. 1. A recirculating delay circuit is defined to be a device which accepts an input light signal and generates therefrom a sequence of delayed light signals. Each generated light signal is displaced in time with respect to the previously generated light signal in the sequence. The generated light signals have the same coherence properties as the input light signal. If the recirculating delay is less than the variable delay provided by moving mirror 314, then the range of marker spacing $X_j$ does not need to be less than the mirror travel, since there will be at least one copy of the reference signal that will have an optical delay in the range covered by the moving mirror.

A recirculating delay may be constructed using a Fabry-Perot cavity. The Fabry-Perot cavity is constructed from two partially reflecting mirrors 363 and 364 which are coincident with the ends of a region of optical material 367 which preferably has the same dispersion characteristics as device 22. Light from coupler 316 is imaged on mirror 363 which admits a fraction of the light which bounces between mirrors 363 and 364. Each time the light pulse strikes one of the mirrors, a portion of the light escapes. The light escaping into fiber 366 forms the reference beam for the interferometer. Optical isolators 367 and 368 isolate the cavity so as to prevent light from the cavity from re-entering coupler 316. The reflectivities of mirrors 363 and 364 are set so as to maximize the number of useful copies of the light pulse reaching coupler 322.

Figure 3:
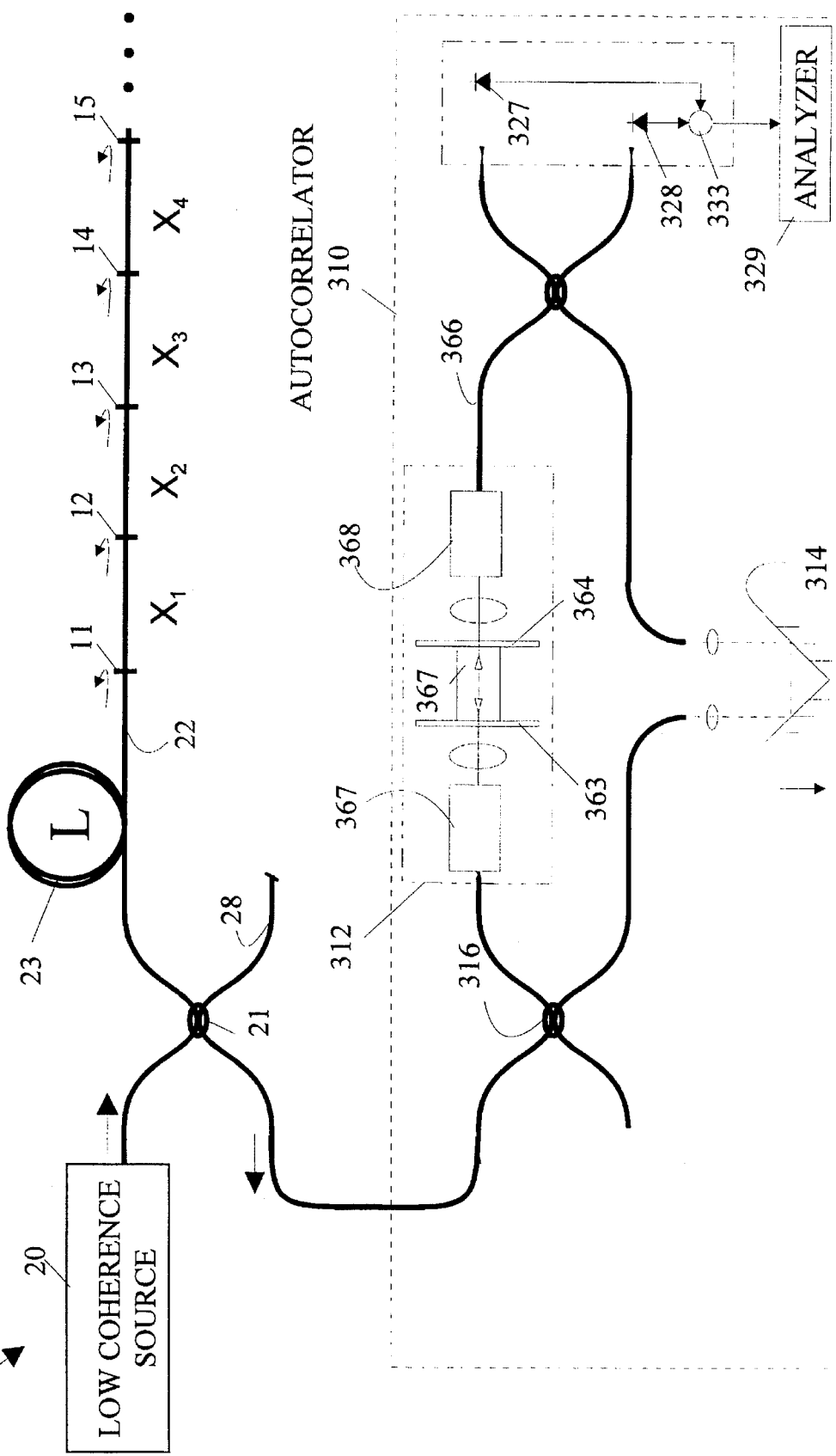
FIG. 3 is a schematic drawing of an experimental arrangement according to the present invention that utilizes a recirculating optical delay.

The embodiment of the present invention shown in FIG. 3 utilizes a balanced detector scheme. When the time delay in the variable delay arm of the interferometer matches the time delay of a reflection from a marker, coherent interference occurs producing a beat signal at a predetermined frequency. The power in the light signal at the beat frequency is detected by a balanced detector comprising two photodiodes 327 and 328 and an adder 333. The balanced detector removes any intensity noise on the incoming optical signals. The subtracted output is then processed electronically to detect the strength of the interference signal. For example, the power spectrum of the subtracted output may be measured by a spectrum analyzer 329.

Various modifications to the present invention will become apparent to those skilled in the art from the foregoing description and accompanying drawings. Accordingly, the present invention is to be limited solely by the scope of the following claims.

What is claimed is:

1. An apparatus for measuring the distance between markers on an optical fiber, said apparatus comprising:

a plurality of markers on said optical fiber, each said marker reflecting a portion of a light signal traversing said fiber from a first end thereof, said markers being introduced at predetermined distances from said first end;

means for generating said light signal and for causing said light signal to enter said first end of said optical fiber;

means for collecting light reflected from said markers; and autocorrelation means for measuring the coherent sum of a first signal comprising said collected light and a second signal comprising said collected light delayed by a variable time delay as a function of said variable time delay, wherein said markers are constructed such that each peak in intensity of said coherent sum can be assigned to reflections generated by a specific pair of said markers.

2. The apparatus of claim 1 wherein two of said markers reflect light of a predetermined wavelength and the remaining said markers do not reflect light of said predetermined wavelength.

3. The apparatus of claim 1 wherein the distance between each said pair of adjacent markers on said optical fiber is different from the distance between each other pair of adjacent markers on said optical fiber.

4. The apparatus of claim 1 wherein the amount of light reflected by at least one of said markers is different from the amount of light reflected by the other said markers.

5. The apparatus of claim 1 wherein said autocorrelation means further comprises delay means for generating a sequence of light signals from said collected light each said generated light signal being displaced in time with respect to the previously generated light signal in said sequence; and wherein said first signal comprises said sequence of light signals.

6. A method for measuring the change in a dimension that characterizes a structure, said method comprising:

attaching an optical fiber to said structure, said optical fiber having a plurality of markers thereon, each said marker reflecting a portion of a light signal traversing said fiber from a first end thereof, said markers being introduced at predetermined distances from said first end, said optical fiber being attached to said structure such that a change in said dimension results in a change in length of a portion of said optical fiber;

generating said light signal and causing said light signal to enter said first end of said optical fiber;

collecting light reflected from said markers; and measuring the coherent sum of a first signal comprising said collected light and a second signal comprising said collected light delayed by a variable time delay as a function of said variable time delay, wherein said markers are constructed such that each peak in intensity of said coherent sum can be assigned to reflections generated by a specific pair of said markers.

7. The method of claim 6 wherein two of said markers reflect light of a predetermined wavelength and the remaining said markers do not reflect light of said predetermined wavelength.

8. The method of claim 6 wherein the distance between each said pair of adjacent markers on said optical fiber is different from the distance between each other pair of adjacent markers on said optical fiber.

9. The method of claim 6 wherein the amount of light reflected by at least one of said markers is different from the amount of light reflected by the other said markers.

10. The method of claim 6 wherein said autocorrelation means further comprises delay means for generating a sequence of light signals from said collected light each said generated light signal being displaced in time with respect to the previously generated light signal in said sequence; and wherein said first signal comprises said sequence of light signals.

11. The method of claim 10 wherein said delay means comprises a Fabry-Perot cavity.

\* \* \* \* \*